Figure 3:
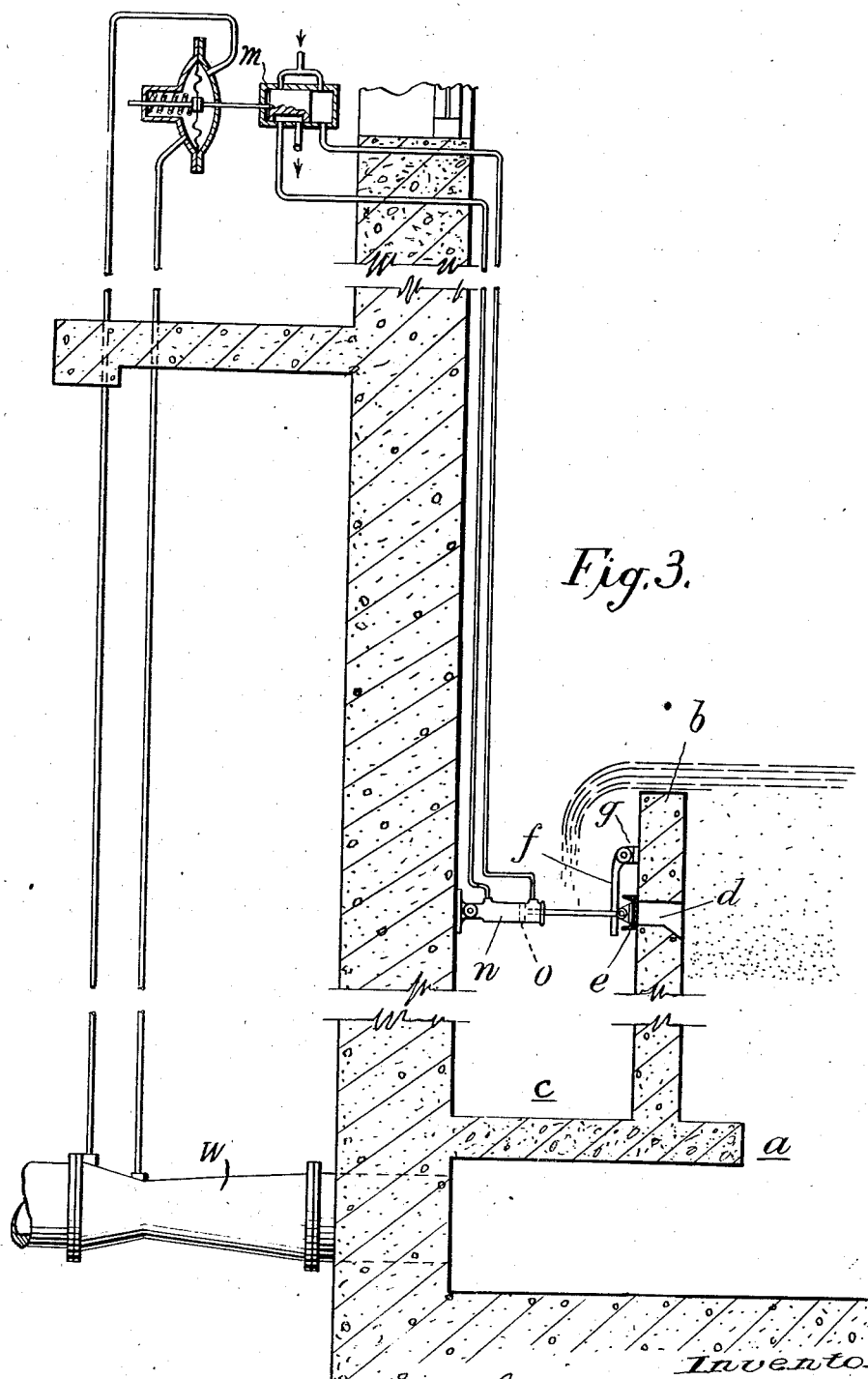

Sept. 18, 1945.  W. SMALLEY  2,384,972
FILTERING APPARATUS
Filed Nov. 17, 1942   2 Sheets-Sheet 1
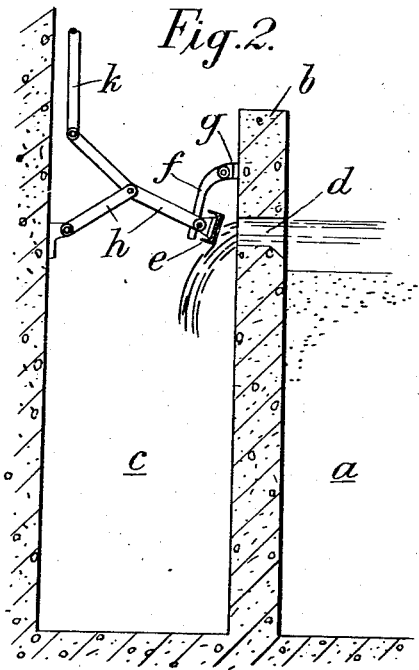
Fig.2.
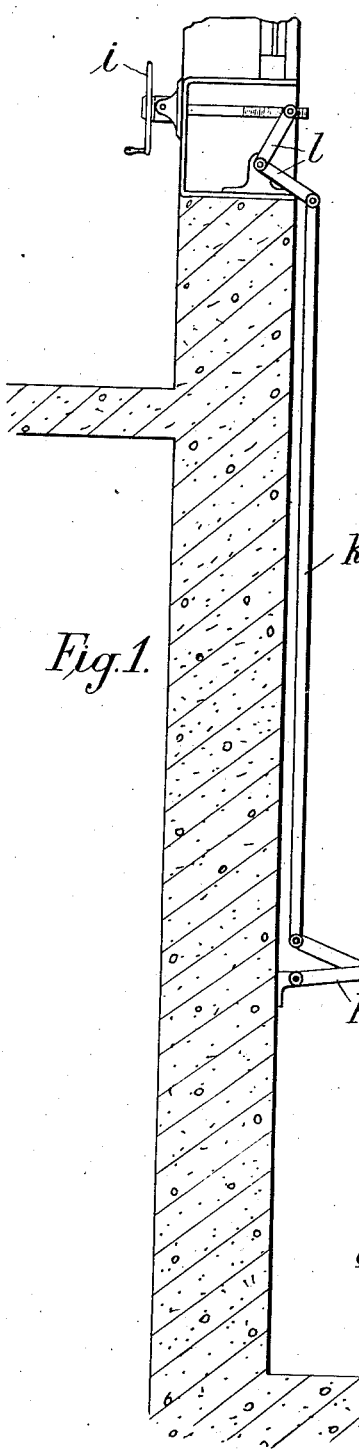
Fig.1.
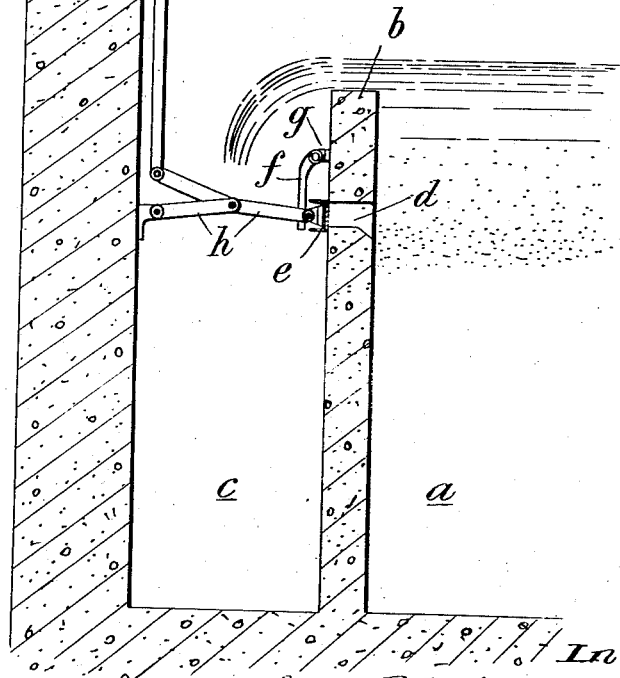
Inventor
W. Smalley Sept. 18, 1945. W. SMALLEY 2,384,972
FILTERING APPARATUS
Filed Nov. 17, 1942 2 Sheets-Sheet 2

Patented Sept. 18, 1945

2,384,972

UNITED STATES PATENT OFFICE 2,384,972

FILTERING APPARATUS

William Smalley, London, W. C. 2, England, assignor to The Paterson Engineering Company Limited, London, England Application November 17, 1942, Serial No. 465,893
In Great Britain October 24, 1941

4 Claims. (Cl. 210—130)

This invention relates to apparatus for the filtration of liquids with particular reference to filters having sand or like granular beds.

As is well known such filter beds are cleansed by means of a reverse flow of wash water through the bed (with or without previous agitation of the bed by compressed air) and a "spill-over" wall is arranged between the filter and the waste trough to prevent wastage of sand during the cleansing operation. As considerable expansion of the bed takes place during the cleansing operation the top of the "spill-over" wall must be of considerable height (usually from 12 to 24 inches above the normal level of the bed) and thus when the flow of wash water ceases a considerable quantity of liquid containing more or less impurities is left above the bed and the impurities in the liquid settle back upon the bed and may interfere to a large extent with the efficient operation of the filter.

Several methods have hitherto been proposed for removing this body of liquid as soon as the bed has settled, and the object of the present invention is to devise improved means for the purpose which will be not only efficient in operation but will also require the expenditure of relatively little power to operate even with very large filters.

According to the present invention I provide in the spill-over wall just above the normal level of the filter bed one or more apertures and we associate with the same one or more rubber-covered pads operated by toggle lever or other mechanism by which the aperture or apertures may be opened and closed as required.

Further features of the invention will be apparent from the description given hereafter.

The accompanying drawings illustrate two modes of carrying out the invention.

Figures 1 and 2 are elevations (partly in section) of one convenient form of apparatus in accordance with the invention, showing parts in two different positions, and Figure 3 is a similar view of a modified form of apparatus.

In carrying my invention into effect in one convenient manner as applied, for example, to ractangular filters I arrange at the end or the side of the filter bed $a$ a spill-over wall $b$ with its lip about two feet above the sand bed, the said wall forming a waste channel $c$ connected to the drain, and allowing free expansion of the sand during the washing operation but preventing its escape with the wash water by reason of its greater density.

During normal operation the water level in the filter is well above the lip of the spill-over wall but when it is desired to cleanse the bed the inlet valve is shut, the waste valve opened and the water drained to waste leaving only the body of water above the filter-bed which is retained by the "spill-over" wall. Wash water is then applied to the underside of the filtering bed causing it to expand and loosening the impurities which spill over into the waste channel, this condition being shown in Figure 1. When the wash water supply is turned off the bed commences to settle but there is still left a body of water retained by the "spill-over" wall which may contain a considerable quantity of impurities which it is desirable to eliminate. For this purpose we provide in the "spill-over" wall at a level of, say, 3 or 4 inches above the sand, a plurality of long narrow horizontal slots $d$ which we arrange to close with a rubber-covered pad $e$, or there may be a plurality of such pads each of which governs the opening and closing of one or more slots. When the upwash is applied to the filter the apertures are closed as shown in Figure 1 and when the cleansing operation has been completed the rate of wash water application is reduced until the bed settles below the level of the discharge apertures $d$ which are then uncovered to permit the escape of the silt-laden waste water as shown in Figure 2. The continued application of wash water at reduced rate prevents the impurities from settling on the bed and indeed floats them to waste, a process which may be assisted by a cross current of water from the inlet supply or other source.

In the particular construction illustrated the pads $d$ are of channel formation and are suspended by means of arms $f$ pivoted to brackets $g$ upon the outside of the "spill-over" wall and their opening and closing movements are effected by toggle lever mechanism $h$ mounted in the waste channel and operated from any convenient point by a hand wheel $i$ and bevel or screw gear with intervening link and lever mechanism $kl$.

It will be understood, however, that any other mode of arranging and operating the pads as well as the shape of the pads themselves may be modified as may be found desirable.

Control of the opening and closing of the apertures may, when desired, be made automatic, for example, by utilising the rate of flow of wash water. This can be effected in many ways but I prefer to utilise the rise in pressure resulting from increase in the rate of wash water application (shown, for example, in Figure 3) by connecting the wash water inlet pipe W on the filter side of the wash water valve to a lightly loaded diaphragm or other valve m controlling pressure water or fluid to or its escape from, a cylinder n having a ram or piston o adapted to operate the closure device. In some cases also the control of the opening and closing may be by electrical means.

I claim:

1. A filtering apparatus of the character described including a walled body having filtering sand in the bottom thereof, a spill-over wall in the bottom of the body confining the sand at one side and spaced from the adjacent wall of the body to provide a waste channel, the top of the spill-over wall being positioned at least a foot above the normal surface of the sand and having at least one aperture therethrough at a point slightly above the normal level of the sand, a member normally closing said aperture and actuating means operatively connected to the closure member for moving the same to open position when reversing the flow of water for cleansing the sand.

2. Filtering apparatus as claimed in claim 1, in which the closure member is in the form of a pad, a rubber covering for the outer face of the pad, a bracket extending from the outer face of the spill-over wall, an arm pivotally suspended from the bracket and operatively connected to the pad, and the actuating means being in linked operative connection with the pad.

3. Filtering apparatus as claimed in claim 1, in which the actuating means includes a toggle mechanism operatively connected to the closure member and manually operating means situated at a point remote from the closure member for operating the toggle mechanism.

4. Filtering apparatus as claimed in claim 1, in which the actuating means includes a cylinder, a piston therein operatively connected to the closure member, and a valve for controlling admission of pressure fluid to and its escape from the cylinder to activate the piston and consequently the closure member, said valve being responsive to rise in pressure due to rate of wash water application.

WILLIAM SMALLEY.